United States Patent Office 3,096,232
Patented July 2, 1963

3,096,232
AQUEOUS EMULSIONS OF WAXES AND RESINS
Charles H. Chapman, San Mateo, Calif., assignor to Hercules Powder Company, Wilmington, Del., a corporation of Delaware
No Drawing. Filed Dec. 24, 1959, Ser. No. 861,747
7 Claims. (Cl. 162—172)

This invention relates to improved aqueous emulsions of waxes and resins and to methods of preparing same.

Most of the acid- and alkali-stable wax emulsions commercially available at the present time are stabilized by a combination of a natural carbohydrate gum and sodium salt of a sulfonic acid, such as sodium lignin sulfonate. There is also some production of emulsions using various other emulsifying agents such as the salts of fatty and resin acids, and of long-chain alkyl amines.

An important object of the present invention is the preparation of emulsions of waxes and resins using cationic starches as the only or principal emulsifying agent.

Another object of the invention is the preparation of emulsions of the indicated type having less color than prior emulsions of this type.

Still another object of the invention is the preparation of wax emulsions which are compatible with phenol-formaldehyde resins of the type used in the manufacture of particle board.

A further object of the invention is the preparation of wax emulsions which can be used to size paper.

In accordance with the invention, these and other objects are accomplished by the provision of aqueous emulsions having, as the dispersed phase, a wax or resin and, as the continuous phase, an aqueous solution of a cationic modified starch. Cationic modified starches which are particularly satisfactory for use herein are amine-modified starches having the formula

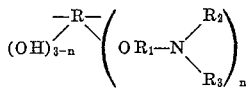

wherein R is the starch molecule repeating unit, R₁ is selected from the group consisting of alkylene, hydroxyalkylene, phenyl alkylene and alkylalkylene in which the alkylene group has from about 1 to about 3 carbon atoms and preferably two carbon atoms, R₂ and R₃ are each selected from the group consisting of alkyl, aryl, aralkyl, cycloalkyl and hydrogen, and $n$ is the average degree of substitution (D.S.) of the starch molecule repeating unit and is a number between and including 0.005 and 3.

Cationic modified starches represented by the above formula may be prepared by etherifying ungelatinized starch as well as starch modifications including dextrinized starch, hydrolyzed starch, oxidized starch and the like, with an etherifying agent selected from the group consisting of dialkylaminoalkyl epoxides, dialkylaminoalkyl halides, and the corresponding compounds containing aryl groups in addition to the alkyl groups.

Representative examples of suitable etherifying agents which may be used herein include β-dimethylaminoethyl chloride; β-diethylaminoethyl chloride; β-dimethylaminoisopropyl chloride; 3-dibutylamino-1,2-epoxypropane; 2-bromo-5-diethylaminopentane hydrobromide; N - (2,3-epoxypropyl) piperidine; and N,N-(2,3 - epoxypropyl) methyl aniline. The various halides (e.g., chloro-, bromo- and so on) can be used interchangeably. Instead of the free amines (e.g., β-diethylaminoethyl chloride), the hydrochloride or other salts of these reagents may also be used. It will also be evident that besides the alkyl, aryl, and aralkyl types, etherifying agents containing cyclic groups may also be used.

The reaction between the starch and the etherifying agent is carried out in an alkaline medium. This is preferably accomplished by suspending the starch in water containing, or to which is subsequently added, (1) sufficient base, such as an alkali metal hydroxide, quaternary ammonium hydroxide or the like, to maintain the mixture in an alkaline state during the reaction and (2) a suitable known gelatinization retarding chemical, such as sodium sulfate, to avoid gelatinization of the starch. The required amount of etherifying agent is then added with constant agitation and the mixture heated at reflux until the etherification reaction is completed. The treated starch may then be separated from the mixture in any suitable manner as by filtration.

The proportion of etherification reagent to be used will vary with the particular reagent chosen and the degree of substitution desired. For purposes of the present invention, the degree of substitution (D.S.) of the starch molecule repeating unit may be from about 0.005 to about 3. The preferred D.S. range is from about 0.01 to 0.1. The etherifying reagent will be used in an amount such that the desired D.S. will be obtained under the conditions of reaction.

The waxes which are particularly useful in the present invention are paraffin waxes in both the refined and the crude forms. Examples of these are crude scale wax, slack wax, fully refined wax and microcrystalline waxes. The waxes should have melting points below 100° C.

The resins which are particularly suitable for use herein are water-insoluble derivatives of rosin such as the glycerol and pentaerythritol esters of rosin, hydrogenated rosin, and polymerized rosin.

In preparing the aqueous emulsions of the invention, the cationic starch is first mixed with water and heated with stirring at a temperature from about 85° C. to about 95° C. for a period of time from about 15 minutes to about 45 minutes. The wax or resin in molten condition, i.e., at about 85° C., is then poured into the heated aqueous starch solution and a premix emulsion formed by stirring for about 10 minutes. In the case of the resins it sometimes is desirable to mix the material with a solvent such as Deobase or other high-boiling hydrocarbon solvent before forming the emulsion in order to depress the softening point and so facilitate the emulsification.

The premix is then homogenized by passing it one or more times through a suitable type of homogenizing apparatus such as a Manton-Gaulin homogenizer, a colloid mill or a supersonic mill such as the Rapisonic emulsifier. The optimum temperature for formation of the premix and subsequent homogenization is about 10° C. above the melting point of the wax or resin. A range from about 5° C. to about 30° C. above the melting point of the wax or resin is permissible as long as the boiling point of the aqueous phase is not exceeded. The premix must be kept at temperature and well agitated until it is homogenized. After homogenization, the emulsion is cooled, strained and put in a closed container.

The upper limit of cationic starch concentration is that determined by the viscosity of the starch solutions which limit handling. This can be determined readily by one skilled in the art. However, as a guide, the upper limit, for most cationic starches, is about 6% for usual commercial equipment.

As regards the lower limit of cationic starch concentration, quite satisfactory emulsions may be prepared with 0.5% starch. While it is possible to utilize smaller amounts, i.e., as little as 0.1% starch, this will seldom be done in commercial practice because of the large volume of water needed for operation.

The concentration of wax or resin utilized in the preparation of these emulsions may vary from as little as about 25% up to about 48% for the wax and from about 20% up to about 43% for the resin. The most practical range, however, is from about 38% to about 43%, and this is the preferred range. The concentrations of starch and wax or resin hereinabove given are percentages by weight based on the weight of the emulsion.

The ratio of wax or resin to cationic starch utilized in the preparation of these emulsions may vary from about 86:1 to about 7:1 or even lower, if desired. The preferred range is from about 25:1 to about 20:1.

While the aqueous wax emulsions of the invention may be used in the surface sizing of paper, they are particularly advantageous when utilized as internal additives. Since the bulk of paper is sized by internal addition, the importance of this will be obvious. When utilized for internal sizing, these aqueous emulsions are added to the aqueous pulp suspension at any point after refining is complete and prior to sheet formation. It is preferred to add them as close to the point of sheet formation as possible. On a paper machine this would be at a point between and including the intake side of the fan pump and the head box.

The emulsions may be added to the pulp suspension at any convenient concentration. This concentration will be dictated by rate of paper production, method of metering and concentration of emulsion preparation.

The aqueous wax emulsions should be added to the aqueous pulp suspension in amounts such as to provide from about 0.05% to about 5%, and preferably from about 0.2% to about 1.0%, by weight of wax based on the dry weight of fiber.

The aqueous resin emulsions of the invention have a particular utility as antislip agents in paper. Some paper sizes decrease the coefficient of friction of paper so that it is too slippery to wind readily on the rolls or be handled in other ways. Addition of the resin emulsions in amounts of .05 to .5% on the fiber at the calender rolls increases the coefficient of friction. The resin emulsions are not affected by alkali as are the Dresinols (rosin emulsions) which are sometimes used for this purpose. A paper used for making paper cups was sized with a ketene dimer sizing agent. After the sizing, it was treated with 0.1–0.2% (resin solids on basis of paper fiber) of a resin dispersion prepared in accordance with the invention. The coefficient of friction was raised to a value as high as that of rosin-sized paper.

Another possible use is as supplementary sizing agents along with ketene dimer sizing agents. In laboratory handsheets, 0.1% ketene dimer emulsified with 0.25% of a cationic starch gave a sizing value of 1,497 seconds (85% reflectance, 20% lactic acid ink, Hercules photometer). When an emulsion containing .05% ester gum was used along with the ketene dimer, a sizing value of 2,691 seconds was obtained. When an emulsion containing 0.1% of a pentaerythritol ester of rosin was used along with the ketene dimer, a sizing value of 3,008 seconds was obtained.

The following examples will illustrate the invention. The cationic starch utilized in Examples 1 and 3–6 inclusive was a commercial product having the general formula

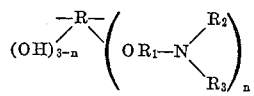

in which R is the starch molecule repeating unit, $R_1$ is ethylene, $R_2$ and $R_3$ are ethyl and $n$ (D.S.) is about 0.03. The cationic starches utilized in Example 2 were derived from an alkali-treated wheat starch by reaction with diethylaminoethyl chloride hydrochloride to degrees of substitution (D.S.) of 0.01, 0.03 and 0.06. The Dowicide G utilized in the examples was an aqueous solution primarily of sodium pentachlorophenate plus sodium salts of other chlorophenols.

EXAMPLE 1

An aqueous emulsion was prepared utilizing the following formulation:

| Ingredients | Parts/100 parts emulsion | | Grams |
| --- | --- | --- | --- |
| | Dry basis | As is basis | |
| Cationic starch (D.S. 0.03) | 1.85 | 2.10 | 110.8 |
| Dowicide G, 20% solution | 0.1 | 0.5 | 26.3 |
| Zinc sulfate, 20% solution | 0.1 | 0.5 | 26.3 |
| Water | 55.0 | 53.95 | 2,840 |
| Fully refined paraffin wax (138–140° F. AMP) | 42.95 | 42.95 | 2,260 |

The cationic starch solution was prepared by slowly adding the powder to the water while stirring vigorously with a propeller-type agitator. The mixture was then stirred vigorously while heating to 90° C. The Dowicide G solution was added, and the mixture stirred and held at 90° C. for 15 minutes. It was then allowed to cool to 80° C. and the zinc sulfate solution added, after which it was stirred and held at 80° C. for about 5 minutes. The molten wax at 85° C. was poured into the aqueous solution and a premix emulsion formed by stirring for 10 minutes. The premix was homogenized by twice passing it through a Manton-Gaulin homogenizer, Model 25 M3BA at 2500 p.s.i.g. and at 80–85° C.

The emulsion was put in a cooling bath and slowly stirred until it was at room temperature. The total solids content was 46.6% and the viscosity as measured in a number five Ford cup was 59 seconds. Another sample of this emulsion had a solids content of 45.3%. After storage for 7 months it showed no separation.

Dilute emulsions of 0.1%, 0.3%, 2.0% and 3.0% were prepared from this emulsion and from a commercial emulsion of a fully refined paraffin wax. Sheets of waterleaf were sized by dipping them into dilute emulsion, passing them through squeeze rolls and drying on a drum drier. The sizing was determined by measuring the seconds required for penetration of standard feather ink to 85% reflectance, as measured by the Hercules photometer. The results are given in the table below.

*Table 1*

| | Sizing, seconds, at emulsion concentration | | | |
| --- | --- | --- | --- | --- |
| | 0.1% | 0.3% | 2.0% | 3.0% |
| Cationic starch wax emulsion | 0 | 12.8 | 199 | 228 |
| Commercial wax emulsion | 0 | 0 | 121 | 166 |

In addition to having better sizing power than the commercial emulsion, the cationic starch emulsion had less color, which is desirable in making papers of high brightness. The advantage in color is shown quantatively in the table below:

*Table 2*

| | Luminous reflectance, percent | Dominant wavelength, mµ | Excitation purity, percent |
| --- | --- | --- | --- |
| Cationic starch wax emulsion | 77.0 | 573 | 2.4 |
| Commercial wax emulsion | 69.7 | 576 | 7.4 |

EXAMPLE 2

Utilizing the same formulation and procedure as in Example 1, three emulsions were prepared using cationic starches derived from wheat starch in the manner hereinbefore described. The properties of the three emulsions are compared in Table 3 below:

*Table 3*

| Degree of substitution of starch | Percent total solids | Viscosity, seconds, No. 4 Ford Cup | Stability minutes [a] | Tub sizing of waterleaf, seconds | |
|---|---|---|---|---|---|
| | | | | 1% emulsion | 1.5% emulsion [b] |
| [c] .01 | 46.1 | 29 | 49 | 86 | 145 |
| .03 | 45.4 | 58 | 76 | 68 | 120 |
| .06 | 46.8 | 76 | 131 | 125 | 178 |

[a] Emulsion was circulated in a closed system with a centrifugal pump until it broke. The time to breaking was recorded.
[b] Sheets of waterleaf were immersed 30 seconds in the dilute emulsions, put through squeeze rolls, and drum dried. The sizing is given in seconds for penetration of standard feather ink to 85% reflectance, in the standard Hercules photometer test.
[c] After 4 months' storage, the 1st and 3rd samples showed no separation, while the 2nd had a very slight zone of separation (3/16" in 7 inches).

EXAMPLE 3

An emulsion was made up according to the following formula:

Parts/100 parts emulsion
Cationic starch (same as Example 1) _____ 2.0
Dowicide G _____ 0.11
Zinc sulfate _____ 0.11
Slack wax _____ 46.4
Water _____ 51.4

The procedure was the same as described in Example 1. An emulsion was obtained which showed no separation after 7 weeks' storage.

EXAMPLE 4

Using the procedure of Example 1, an emulsion was made up according to the following formula:

Parts/100 parts emulsion
Cationic starch (same as Example 1) _____ 1.85
Dowicide G _____ 0.1
Zinc sulfate _____ 0.1
Water _____ 55.0
Crude scale wax _____ 42.95

The product was a viscous stable emulsion which showed no separation after standing six weeks.

In order to show its utility as a waterproofing agent in conjunction with resin binders for products such as particle board and hard board, the emulsion (35 parts) was mixed with a water-soluble phenolic resin, Monsanto PF-575 (250 parts). No scum or precipitate was formed. Two commercial crude scale wax emulsions formed precipitates under the same conditions.

The superior whiteness of the emulsion, as compared to a commercial crude scale wax emulsion, was shown by the following data:

*Table 4*

| | Luminous reflectance, percent | Dominant wavelength, mμ | Excitation purity, percent |
|---|---|---|---|
| Cationic starch wax emulsion | 76.1 | 573 | 2.4 |
| Commercial wax emulsion | 69.5 | 573 | 7.6 |

EXAMPLE 5

Cationic starch (140 g.) was cooked in 4000 g. water and then diluted to 4660 g. with boiling water. Three hundred grams of ester gum 8L (glycerol ester of rosin) was warmed with 45 ml. Deobase (light hydrocarbon distillate) till homogeneous. (Temperature reached 120° C.) The two hot solutions were poured simultaneously through the Premier mill which had been heated previously with atmospheric steam passing through the jacket of the stator. The clearance of the mill was set at 2½ mils. After the addition was complete, about 40 g. of the resin remained in the pot in which the resin was heated. The emulsion from the first pass was passed through the mill a second time. After the emulsion had cooled to room temperature, it was filtered through a 100-mesh screen to remove a few lumps of resin which remained. The milky emulsion did not separate significantly on standing for 3 months at room temperature.

EXAMPLE 6

The procedure of Example 5 was utilized to prepare an emulsion of a pentaerythritol ester of rosin. This emulsion likewise did not separate significantly on standing for 3 months at room temperature.

EXAMPLE 7

Using the same procedure as outlined in Example 1, except that a larger two-stage homogenizer was used, emulsions of the following formulation were made. The homogenized emulsions were cooled by pumping through a cooling coil.

Ingredients: Parts/100 parts emulsion
Crude scale wax _____ 37.95
Cationic starch (same as Example 1) _____ 1.85
Dowicide G _____ 0.10
Zinc sulfate _____ 0.10
Water _____ 60

Different homogenization pressures were used to obtain emulsions of different particle sizes. The results are summarized in Table 5 below:

*Table 5*

| | Sample 1 | Sample 2 | Sample 3 | Sample 4 |
|---|---|---|---|---|
| Pressure 1st valve | 1,200 | 2,000 | 1,700 | 1,700 |
| Pressure, 2nd valve | 0 | 0 | 800 | 800 |
| No. passes | 1 | 1 | 1 | 2 |
| Total solids, percent | 41.32 | 41.48 | 41.02 | 39.98 |
| Viscosity, time in seconds to flow through No. 4 Ford cup (72° F.) | 50 | 37 | 35 | 41 |
| Microscopic particle size: | | | | |
| Average | 5 | 3 | 2 | 2 |
| Maximum | 25 | 5 | 5 | 3.5 |
| Minimum | 2 | 0.5 | <0.5 | <0.5 |

The aqueous wax emulsions prepared in accordance with the invention are characterized by their superior sizing and by their absence of color. Moreover, when made in a particle size comparable to samples 3 and 4 of Example 7, the emulsions are stable to pumping and compatible with phenolic resin which is an advantage for its use in hard board and particle board made with phenolic resin binder.

While preferred embodiments of the invention have been illustrated and described, the invention is not to be construed as limited to the details thereof except as the same may be included in the following claims.

What I claim and desire to protect by Letters Patent is:

1. As a new composition of matter an aqueous emulsion comprising, as the continuous phase, from about 0.1% to about 6% by weight, based on the weight of the emulsion, of a cationic starch having the formula

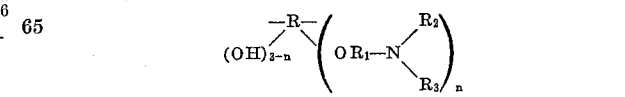

where R is the starch molecule repeating unit, $R_1$ is selected from the group consisting of alkylene, hydroxyalkylene, phenyl alkylene and alkylalkylene groups, $R_2$ and $R_3$ are each selected from the group consisting of hydrogen, alkyl, aryl, aralkyl, and cycloalkyl groups and $n$ is from about 0.005 to about 3 and, as the dispersed phase, a material selected from the group consisting of paraffin waxes and water-insoluble polyhydric alcohol esters of rosin.

2. An aqueous emulsion in accordance with claim 1 wherein the disperse phase comprises paraffin wax.

3. An aqueous emulsion as set forth in claim 2 wherein the concentration of wax is from about 25% to about 48% by weight, based on the weight of the emulsion, and the concentration of cationic starch is from about 0.5% to about 4% by weight, based on the weight of the emulsion.

4. An aqueous emulsion in accordance with claim 1 wherein the disperse phase comprises a water-insoluble ester of rosin selected from the group consisting of the glycerol esters of rosin and the pentaerythritol esters of rosin.

5. An aqueous emulsion as set forth in claim 4 wherein the concentration of water-insoluble ester of rosin is from about 20% to about 43% by weight, based on the weight of emulsion, and the concentration of cationic starch is from about 0.5% to about 4% by weight, based on the weight of emulsion.

6. A process of sizing paper which comprises treating the same with an aqueous emulsion having, as the continuous phase, an aqueous solution of from about 0.1% to about 6% by weight, based on the weight of the emulsion, of a cationic starch having the formula

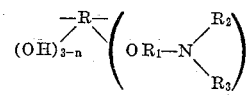

where R is the starch molecule repeating unit, $R_1$ is selected from the group consisting of alkylene, hydroxyalkylene, phenyl alkylene and alkylalkylene groups, $R_2$ and $R_3$ are each selected from the group consisting of hydrogen, alkyl, aryl, aralkyl and cycloalkyl groups and $n$ is from about 0.005 to about 3 and, as the dispersed phase, a paraffin wax, and then drying the paper.

7. A process for the internal sizing of paper which comprises adding to an aqueous suspension of paper pulp at a point ahead of sheet formation an aqueous emulsion having as the continuous phase, an aqueous solution of from about 0.1% to about 6% by weight, based on the weight of the emulsion, of a cationic starch having the formula

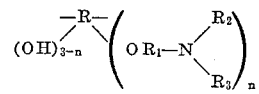

where R is the starch molecule repeating unit, $R_1$ is selected from the group consisting of alkylene, hydroxyalkylene, phenyl alkylene and alkylalkylene groups, $R_2$ and $R_3$ are each selected from the group consisting of hydrogen, alkyl, aryl, aralkyl and cycloalkyl groups and $n$ is from about 0.005 to about 3 and, as the dispersed phase, a paraffin wax, forming a sheet from the said pulp, and drying the sheet.

References Cited in the file of this patent

UNITED STATES PATENTS

| | | |
|---|---|---|
| 1,367,274 | Miles | Feb. 1, 1921 |
| 1,607,517 | Ellis | Nov. 16, 1926 |
| 1,903,787 | Lodge | Apr. 18, 1933 |
| 2,876,217 | Paschall | Mar. 3, 1959 |
| 2,917,506 | Caldwell et al. | Dec. 15, 1959 |
| 2,935,436 | Caldwell et al. | May 3, 1960 |
| 3,006,806 | Schur | Oct. 31, 1961 |